June 17, 1930.  R. B. NOBLE  1,764,116
PULL-OFF MECHANISM FOR ROLLER BEARINGS
Filed Aug. 29, 1927
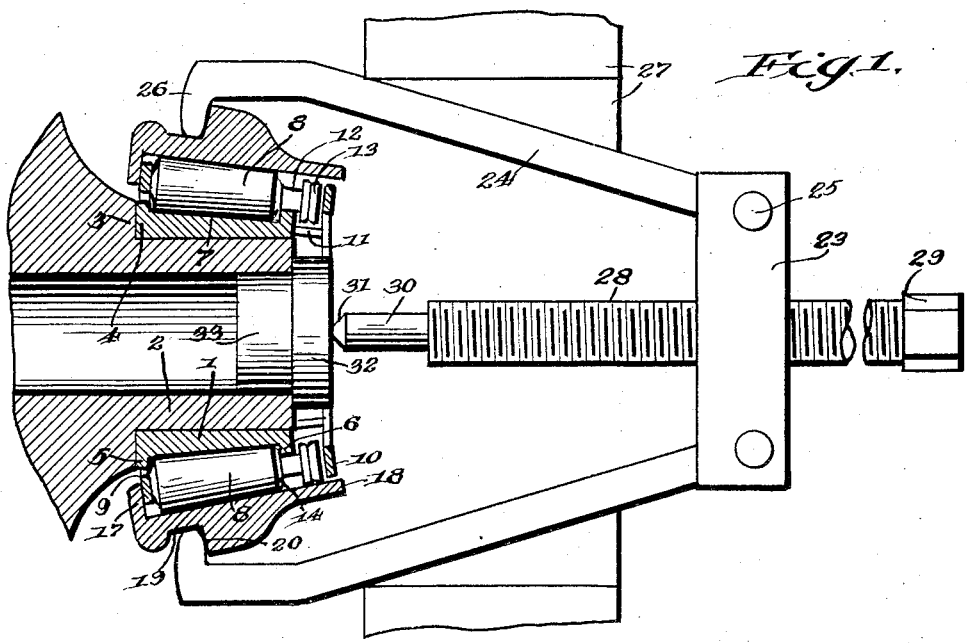
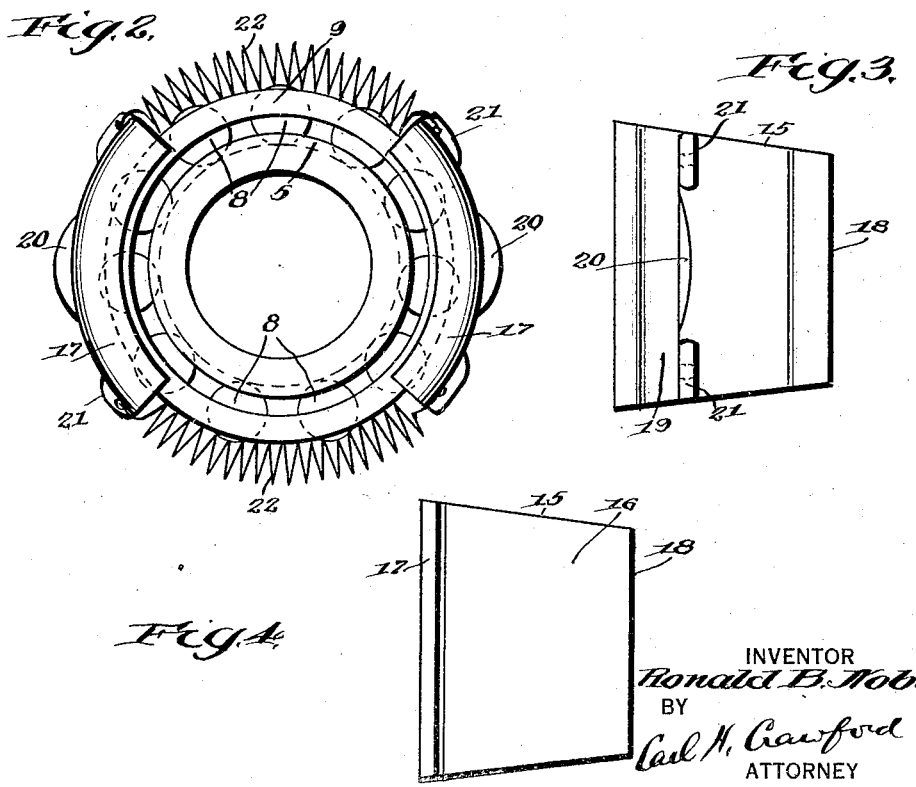
INVENTOR
Ronald B. Noble
BY
Carl N. Crawford
ATTORNEY Patented June 17, 1930

1,764,116

UNITED STATES PATENT OFFICE

RONALD B. NOBLE, OF SPOKANE, WASHINGTON

PULL-OFF MECHANISM FOR ROLLER BEARINGS

Application filed August 29, 1927. Serial No. 216,185.

The object of this invention is to provide a means adapted to act in combination with any kind of puller mechanism for removing an anti-friction bearing from its journal without injury to the bearing.

The invention is especially designed to operate on tapered roller bearings comprising an inner race member on which a series of anti-friction rollers are mounted and to one end of which member the rollers are structurally and rotatively connected, the rollers being held in annular relation to the race member by a radially outwardly disposed annular cage.

In practice, the bearing is mounted tightly on a journal with the endwise inner end of the race member in tight abutment against a shoulder of the journal, hence, it is difficult, if not impossible to remove the bearing without injury thereto as the strongest part of the bearing, namely, the race member, is inaccessible to a prying instrument, and no means has heretofore been devised to apply removing stress to the race member annularly thereof.

In accordance with my invention, pulling off stress is applied to the rollers, and preferably lengthwise thereof, to transmit such stress to the race member annularly thereof to remove said member from the journal, the usually frail cage member being protected by the rollers against bending or other deforming stresses or strains.

The invention will be more fully described in connection with the accompanying drawing and will be more particularly pointed out in and by the appended claims.

In the drawing:

Fig. 1, is a plan view partly in section and partly in elevation, showing the manner in which a roller bearing may be removed in accordance with my invention.

Fig. 2, is an end view in elevation of the bearing looking from the left of Fig. 1, and showing my improved shoes and the means whereby the latter are held in position.

Fig. 3, is a view in elevation of one of the shoes showing the outside face thereof.

Fig. 4, is a view in elevation of the shoe showing the inside face thereof.

Like characters of reference designate similar parts throughout the different figures of the drawing.

I have shown the race member 1, of a tapered roller bearing mounted on a hollow journal 2 having a shoulder 3, against which the inner end 4, of the race member abuts, the shoulder 3 being shown as having a diameter substantially equal to that of the inner end 4 of the member 1. Irrespective of whether the journal on which the bearing is mounted is hollow or not, the end 4, is butted against the shoulder 3 in such a manner as to be in-accessible to an insertable tool therebetween, without injury to the race 1. The race 1, is shown provided with inner and outer radial flanges 5 and 6, respectively, the former being radially higher, and the annular surface therebetween, as indicated at 7, being the race on which a series of tapered rollers 8 revolve, the race 7, being tapered from flange 5 to flange 6, as clearly shown in Fig. 1. The rollers are held in circumferentially spaced relation by what is termed a cage which usually comprises inner and outer rings 9 and 10, connected by spacing members 11, which also hold the rollers in spaced relation, and against radial displacement off from the cage, as is well known. The cage and rollers are in floating relation to the race member 1, the cage being slightly movable endwise with respect to the rollers 8, to afford the latter a limited degree of endwise play. The outer or smaller ends of the rollers are structurally connected with the race member 1, in a rotative manner, by being reduced at 12, to receive flange 6, and having heads 13 overhanging the outer faces of flange 6. Thus each roller is provided with a shoulder 14, which is also adapted to limit outward endwise play, the heads 13, limiting inner endwise play. It will also be noted that the outer peripheries of the rollers 8, extend radially beyond the cage rings 9 and 10, and will so project until the bearing is worn too much to be useful.

I have described a conventional form of roller bearing sufficiently to make it clear how the device of my invention functions, or may function in connection therewith, and I will next describe what constitutes the invention itself.

The device of my invention includes means circumferentially embracing the bearing and said means consist in part of coacting segmental gripping members or shoes, 15, both of which are identical in form and function and only one requiring detailed description. Referring in detail to the construction of one of the shoes, the same has an inner arcuate face 16 which is arched transversely of its length to engage the peripheries of a plurality of rollers 8, as clearly shown in Figs. 1 and 2. At its inner end, the shoe is provided with a tension flange 17 which is adapted to laterally engage ring 9, of the cage, and the outer end 18 may extend over and in spaced relation to the ring 10, of the cage. In the description of the shoe, the length thereof will be considered as the distance between the flange end 17 and the end 18. Transversely of the shoe, and on its outer face, I have provided a gripping face or groove 19, which is relatively shallow and which is disposed abreast of an elevated puller shoulder 20. Lugs 21, provided with suitable apertures, are disposed in a convenient position to afford anchorage for means such as springs 22, the ends of which are connected with said lugs to hold the shoes 15 in position prior to application thereto of pulling stress. Further, this flexibly extensible form of structure enables me to make a single device that will accommodate itself to a variety of sizes of bearings. It may also be stated that the length of the shoes is made sufficient to take either the longest or shortest bearing and always afford a full length roller bearing engagement.

In use, I may employ any of the forms of puller mechanism of which I have shown one form which I will very generally describe as this feature is broadly, not specifically, a part of my invention.

A head is shown at 23 to which puller arms 24 are pivoted at 25. The free ends of said arms 24 have interned hook portions 26, for engagement with said shoulders 20. As reliance is not placed upon springs 22, for holding the shoes 15 in position under pulling stress, it is usual to grip the arms 24, in the jaws of a vice, the jaws of which are generally indicated at 27, in order to hold the ends 26, in firm engagement against the gripping grooves 19, and hence, in effective engagement with pulling shoulders 20. A push screw 28, has threaded engagement with head 23 and is provided with a polygonal end 29 for application of a wrench thereto. The remaining end 30, is reduced and suitably coned at 31 for engagement with a center head 32 that may rest against the journal 2, said head 32 having a shank 33 internally telescoping said journal 2.

Now it will be clear that as the screw 28 is turned to impose tension on arms 24, a pull will be exerted on the shoes 15, through the shoulders 20, thereof. This pull will be applied, it is true, directly against the ring 9, of the cage, but as a matter of fact, the endwise play afforded will cause the ring 9 to move into abutting relation against the larger inner ends of roller 8, so that as a matter of actual fact and practice, the ring 9 will not sustain any bending stress at all, in fact nothing but compression stress while it is interposed between flanges 17 and the larger ends of rollers 8. This stress thus imposed is transmitted lengthwise of rollers 8, through shoulders 14, of the rollers, to flange 6, of the race member 1, and when the stress is sufficient, the race 1 will be slipped off from journal 2. As each flange 17, engages a plurality of rollers, as will be seen from Fig. 2, the pulling stress is thus distributed between the rollers engaged in such a manner as not in the least to injure the parts stressed. Thus, it is not necessary to have the shoe structure annular, and by having the shoes segmental, and employing the springs 22, I can fit the device to a wide range of size of bearing.

The importance of applying inward pressure on arms 24, during the pulling operation, will now be clear since it is necessary to hold the shoes 15 firmly against the rollers in order, first, to have a secure bearing for the shoes, and second, to prevent the shoes from slipping off from the sloping or tapered bearing under the severe stress applied. Further, the stress from the shallow shoulders 14, must be squarely applied to the flange 6, otherwise, the rollers might slip off from said flange.

Now it will be clear that I apply the pulling stress, in actual practice, radially outwardly from the rear end of the race 1, and transmit such stress to the front end thereof, and by doing this, in the manner set forth, I take full advantage of that portion of the bearing which is freely accessible and ignore that portion, namely, flange 4, which is not accessible.

My invention resides in the combination set forth, and also in the shoes and springs, as a separate device, and while I have herein shown and described one specific form of my invention, I do not wish to be limited thereto except for such limitations as the claims may import.

I claim:—

1. As a means of removing a cage tapered roller bearing from a journal, gripping shoes each adapted to engage a series of rollers throughout the length thereof on opposite diametrical portions of the bearing, and each shoe having a tension flange adapted to engage the cage of the bearing, and each shoe having a gripping face midway of the length thereof and a puller shoulder abreast of said shoulder to receive gripping stress substantially midway of the length of said shoes, springs connecting said shoes to hold the latter in position prior to the application of pulling stress thereto.

2. As a new and useful article of manufacture, segmental shoes having portions for peripheral and endwise engagement with a roller bearing and provided with puller shoulders projecting exteriorly therefrom, and springs for holding said shoes in position on the bearing.

3. In a device for removing a roller bearing assembly comprising bearing rollers and a race having a radially extending flange at its outer end, from a journal member to which said race is fitted, the combination of a plurality of segment shoes each of which includes means adapted to rest on a plurality of said rollers whereby the respective shoe is located in position, each of said shoes having a flange to extend radially past the inner end of a roller when the shoe is in position whereby the respective shoe is adapted to transmit power along the length of the rollers and thereby against said race flange, and means for exerting power upon all of said segment shoes substantially in the axial direction of the bearing whereby to remove the same, said resting means being caused during such pulling to hold said rollers in engagement with said race flange.

4. A device as in claim 3, in which each said flange extends radially past the ends of a plurality of rollers whereby the power from said shoe is exerted upon a plurality of said rollers and thereby distributed peripherally around said race flange.

5. In a device for removing a roller bearing assembly comprising bearing rollers and a race having a radially extending flange at its outer end, from a journal member to which said race is fitted, the combination of a plurality of segment shoes each of which includes means adapted to rest on a plurality of said rollers whereby the respective shoe is located in position, each of said shoes also having a flange to extend radially past the end of a roller when the shoe is in position whereby the respective shoe is adapted to transmit power along the length of the rollers and thereby against said race flange, and means for exerting power upon all of said segment shoes substantially in the axial direction of the bearing and including individual puller arms having means thereon to interengage with a respective shoe whereby the shoe may adapt itself to the angle existing between said rollers and the axis of said bearings, said resting means being caused by said power exerting means during the pulling to bear upon said rollers to hold the same in engagement with said race flange.

6. In a device for removing a roller bearing assembly comprising bearing rollers, a cage connected to said rollers and including a member extending across the inner ends thereof, and a race upon which said rollers are seated and itself having a radially extending flange at its inner end, from a journal member to which said race is fitted, the combination of a plurality of segment shoes each of which includes means to rest on a plurality of said rollers whereby the respective shoe is located in position, each of said shoes having a flange to extend radially with respect to said bearing assembly and to engage said cage member when the shoe is in position whereby the respective shoe is adapted to transmit power to said cage member and thence along the length of the rollers and thereby against said race flange, and means for exerting power upon all of said segment shoes substantially in the axial direction of the bearing whereby to remove the same, said resting means being caused during the pulling to hold said rollers in engagement with said race flange.

7. In a device for removing a conical roller bearing assembly comprising bearing rollers and a race having a radially extending flange at its outer end, from a journal member to which said race is fitted, the combination of a plurality of segment shoes each of which includes means adapted to rest on a plurality of said rollers whereby the respective shoe is located in position, each of said shoes having a flange to extend radially past the end of a roller when the shoe is in position whereby the respective shoe is adapted to transmit power along the length of the rollers and thereby against said race flange, a respective puller arm adapted to pivotally engage each of said segment shoes, and means to pull all of said arms and therewith said shoes substantially in the axial direction of the bearing whereby to remove the same, and means cooperating with said puller arms to cause the same to force said segment shoes toward the bearing assembly and thereby cause said resting means to hold said rollers in engagement with said race flange during the pulling.

In witness whereof, I hereby affix my signature.

RONALD B. NOBLE.